US010028301B2

(12) United States Patent
Burbidge et al.

(10) Patent No.: US 10,028,301 B2
(45) Date of Patent: *Jul. 17, 2018

(54) DEVICE TO-DEVICE (D2D) COMMUNICATIONS

(71) Applicant: INTEL IP CORPORATION, Santa Clara, CA (US)

(72) Inventors: Richard C. Burbidge, Shrivenham (GB); Robert Zaus, Munich (DE); Youn Hyoung Heo, Seoul (KR); Hong He, Beijing (CN)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,890

(22) Filed: Apr. 20, 2017

(65) Prior Publication Data

US 2017/0339715 A1 Nov. 23, 2017

Related U.S. Application Data

(63) Continuation of application No. 14/583,030, filed on Dec. 24, 2014, now Pat. No. 9,661,653.

(Continued)

(51) Int. Cl.
*H04W 72/14* (2009.01)
*H04W 76/14* (2018.01)
(Continued)

(52) U.S. Cl.
CPC ........... *H04W 72/14* (2013.01); *H04W 76/14* (2018.02); *H04W 72/1284* (2013.01); *H04W 76/27* (2018.02)

(58) Field of Classification Search
CPC ........................... H04W 72/14; H04W 76/023
See application file for complete search history.

(56) References Cited

U.S. PATENT DOCUMENTS

2012/0044897 A1 2/2012 Wager et al.
2012/0184306 A1 7/2012 Zou et al.
(Continued)

FOREIGN PATENT DOCUMENTS

EP 2983425 A1 2/2016
JP 2010081597 A 4/2010
(Continued)

OTHER PUBLICATIONS

Intel Corporation; "Discussion on Out of Coverage Definition"; 3GPP TSG RAN WG1 R1-141547; Mar./Apr. 2014; 3 pages; Meeting 76bis; Agenda 7.2.7.2.3; Shenzhen, China.

(Continued)

*Primary Examiner* — Ronald B Abelson
(74) *Attorney, Agent, or Firm* — Thorpe North Western

(57) ABSTRACT

Technology for performing device-to-device (D2D) communications is disclosed. A user equipment (UE) can identify D2D data to be transmitted from the UE. The D2D data can be identified when the UE is in a radio resource control (RRC) idle. The UE can be limited to using a defined resource allocation mode to transmit the D2D data from the UE. A service request procedure can be initiated at the UE. The service request procedure can trigger the UE to perform an RRC connection establishment procedure with an evolved node B (eNB) to switch the UE from the RRC idle mode to an RRC connected mode. The UE can receive an uplink (UL) grant from the eNB for communicating the D2D data from the UE. The UE can send the D2D data using the UL grant provided by the eNB.

19 Claims, 8 Drawing Sheets

Related U.S. Application Data

(60) Provisional application No. 61/990,679, filed on May 8, 2014.

(51) Int. Cl.
*H04W 72/12* (2009.01)
*H04W 76/27* (2018.01)

(56) References Cited

U.S. PATENT DOCUMENTS

| | | | |
|---|---|---|---|
| 2012/0207045 A1* | 8/2012 | Pelletier | H04B 7/0404 370/252 |
| 2014/0056220 A1 | 2/2014 | Poitau et al. | |
| 2014/0098740 A1* | 4/2014 | Xing | H04W 4/001 370/328 |
| 2014/0235232 A1 | 8/2014 | Lee et al. | |

FOREIGN PATENT DOCUMENTS

| | | |
|---|---|---|
| JP | 2013507025 A | 2/2013 |
| WO | WO 2003/021467 A1 | 3/2003 |
| WO | WO 2005/045740 A2 | 5/2005 |
| WO | WO 2011/039636 A2 | 4/2011 |
| WO | WO 2011/144162 A1 | 11/2011 |
| WO | WO 2014/014326 A1 | 1/2014 |
| WO | WO 2014/058223 A2 | 4/2014 |
| WO | WO2014058223 * | 4/2014 ............ H04W 48/16 |

OTHER PUBLICATIONS

Interdigital; "Determination of in-coverage, out-of-coverage, edge of coverage for D2D UEs"; 3GPP TSG RAN WG1 R1-141559; Mar./Apr. 2014; 4 pages; Meeting 76bis; Agenda 7.2.7.2.3; Shenzhen, China.

Qualcomm Incorporated; "Definitions of coverage states and mode switching for D2D"; 3GPP TSG RAN WG1 R1-141452; Mar./Apr. 2014; 4 pages; Meeting 76bis; Agenda 7.2.7.2.3; Shenzhen, China.

Samsung; "Mode 1 resource allocation for D2D broadcast communication"; 3GPP TSG RAN WG1 R1-141307; Apr. 2014; 5 pages; Meeting 76bis; Agenda 7.2.7.2.2; Shenzhen, China.

3GPP TS 36.331; "$3^{rd}$ Generation Partnership Project; Technical Specification Group Radio Access Network; Evolved Universal Terrestrial Radio Access (E-UTRA); Radio Resource Control (RRC); Protocol specification"; (Dec. 2013); 310 pages; V 10.12.0, Release 10.

ETRI; "Fully scheduled D2D transmission in LTE-coverage"; 3GPP TSG R2-134095; (Nov. 11-15, 2013); 3 pages; RAN WG2 #84, San Francisco, USA; Agenda 7.5.3.1.

ETRI; "Procedure for Mode 1 D2D communication"; 3GPP TSG R2-141473; (Mar. 31-Apr. 4, 2014); 4 pages; RAN WG2 #85bis, Valencia, Spain; Agenda 7.4.2.

Intel Corporation; "Resource allocation for D2D discovery"; 3GPP TSG R2-133512; (Oct. 7-11, 2013); 4 pages; RAN2 Meeting #83bis, Ljubljana, Slovenia; Agenda 7.5.1.

Extended European search report dated (Nov. 15, 2017), in EP Application No. 15788732.4, filed (Apr. 3, 2015); 10 pages.

\* cited by examiner

```
SystemInformationBlockType2 ::=    SEQUENCE { ac-BarringForD2D-r12         AC-BarringConfig
    OPTIONAL     -- Need OP

}
```

US 10,028,301 B2

DEVICE TO-DEVICE (D2D) COMMUNICATIONS

RELATED APPLICATIONS

This application is a continuation of U.S. patent application Ser. No. 14/583,030 filed Dec. 24, 2014 which claims priority to U.S. Provisional Patent Application No. 61/990,679, filed May 8, 2014, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
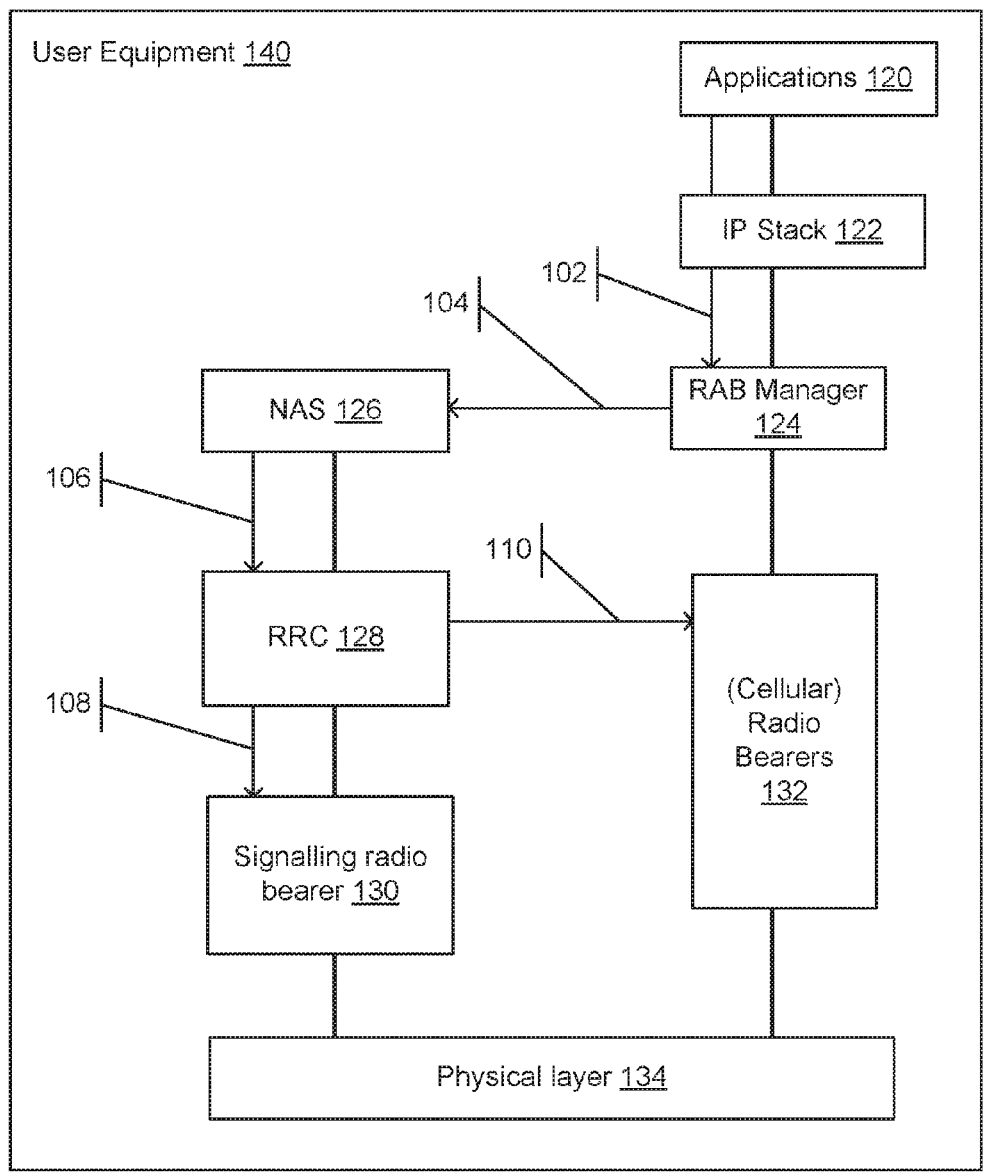
FIG. 1 illustrates a legacy technique for establishing a radio resource control (RRC) connection for a user equipment (UE) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for performing device-to-device (D2D) communications at a user equipment (UE). The UE can operate according to LTE/E-UTRAN related standards, or the UE can operate in a cellular mobile network according to the 3GPP LTE Release 12 (or earlier) standard for E-UTRAN. In one example, the UE that is sending D2D data can be referred to as a sending UE and the UE that is receiving the D2D data can be referred to as a destination UE, target UE, or a receiving UE. The D2D data can be generated by a D2D application that is running on the UE. The UE can identify that the D2D data is to be transmitted to the target UE using a D2D radio bearer of the UE. In one example, the D2D data can be sent from the sending UE to a single target UE or a group of target UEs. The D2D application can generate the D2D data to send to the target UE when the UE is in a radio resource control (RRC) idle mode. In addition, the D2D radio bearer of the UE can be present when the UE is in the RRC idle mode, but cellular radio bearers (or data radio bearers) may not be established when the UE is in the RRC idle mode.

In order for the UE to send the D2D data to the target UE, the UE can transition into an RRC connected mode. The UE can determine that a defined resource allocation mode is to be used for communicating the D2D data to the target mode. The UE can determine the defined resource allocation mode based on system information block (SIB) broadcast from the eNB. In one example, the defined resource allocation mode can be D2D resource allocation mode 1. A service request procedure can be initiated at a non-access stratum (NAS) of the UE. The service request procedure can trigger an RRC layer of the UE to perform an RRC connection establishment procedure with the eNB. The UE can switch from the RRC idle mode to an RRC connected mode upon completion of the RRC connection establishment procedure. The UE, now in the RRC connected mode, can send a buffer status report (BSR) to the eNB, and in response, the UE can receive an uplink (UL) grant from the eNB for transmission of the D2D data to the target UE. The UE can send the D2D data to the target UE using the UL grant provided by the eNB. The D2D data can be transmitted to the target UE using the D2D radio bearer of the UE.

In an alternative configuration, the D2D data can be generated by the D2D application that is running on the UE when the UE is already in the RRC connected mode. In other words, the cellular radio bearers can already be established for the UE, as well as the D2D radio bearers. The UE can determine that the defined resource allocation mode (e.g., D2D resource allocation mode 1) is to be used for communicating the D2D data to the target mode. The UE can send an RRC configuration request message to the eNB using a signaling radio bearer of the UE, and in response, the UE can receive an RRC connection reconfiguration message from the eNB. The RRC connection reconfiguration message can include one or more configuration parameters for the defined resource allocation mode. Some examples of these configuration parameters can include a periodic D2D BSR timer or a D2D BSR retransmission timer. The UE can send a buffer status report (BSR) to the eNB using the one or more configuration parameters. In response, the UE can receive an uplink (UL) grant from the eNB for transmission of the D2D data to the target UE. The UE can send the D2D data to the target UE using the UL grant provided by the eNB. In addition, the UE can send the D2D data using the D2D radio bearers of the UE.

Device to device (D2D) communication for 3GPP LTE networks, such as an Evolved Universal Terrestrial Radio Access network (E-UTRAN), is being standardized in 3GPP LTE Release 12. A D2D communication is a direct communication between two devices, such as two user equipments (UEs). The two devices (e.g., LTE-based devices) can communicate directly with one another when the two devices are in close proximity, but such D2D communications do not use the cellular network infrastructure. One particular application for D2D communications is related to public safety services. Furthermore, D2D communication can allow direct communication from one UE to one or more target or receiving UEs, thus enabling group communication. Examples described herein can refer to transmission to a target or receiving UE, but it should be understood that this could also be a transmission to a group of target or receiving UEs.

D2D can allow a direct link between two UEs that are using the cellular spectrum. As a result, media or other data can be transferred from one device to another device over short distances and using a direct connection. By using D2D data communications, the data can be communicated directly without being relayed to the cellular network, thereby avoiding problems with lack of or poor network coverage or with overloading the network. The cellular infrastructure, if present can assist with other issues, such as peer discovery, synchronization, and the provision of identity and security information.

The use of D2D communication can provide several benefits to users. For example, the devices can be remote from cellular infrastructure. D2D can allow devices to communicate locally, even when the cellular network has failed (e.g., during a disaster) because D2D communication does not rely on the network infrastructure. By using licensed spectrum, the frequencies used to perform the D2D communications are less subject to interference. In addition, if the two devices are in close proximity, then reduced transmission power levels are used, thereby saving power at the devices.

D2D communication features can be referred to as ProSe (Proximity Services) Direct Commination in the 3GPP LTE standard. D2D communications are primarily targeted for public safety use cases, but can be used for other applications as well. The D2D feature enables the direct communication between UEs over the cellular radio spectrum, but without the data being carried by the cellular network infrastructure. D2D communication can occur when the UE is outside of the coverage of the cellular network, or alternatively, when the UE in within coverage of the cellular network. Within the access stratum of the UE, the D2D data can be carried by a D2D radio bearer.

While D2D radio bearers are similar to the radio bearers used for cellular communication, there are several key differences. For example, a D2D radio bearer can exist in the UE when the UE is in either a radio resource control (RRC) idle mode or an RRC connected mode. In other words, the D2D radio bearer can exist when the UE is in either RRC_IDLE mode or RRC_CONNECTED mode. In contrast, cellular radio bearers (or data radio bearers) can only exist when the UE is in the RRC connected mode. In addition, D2D radio bearers can be created and released by the UE as necessary based on the arrival of data from application layers of the UE. In contrast, cellular radio bearers are created, configured and released by the network.

When the UE is within the coverage of the cellular network, it can be beneficial to coordinate D2D transmissions from the UE with other UE transmissions in the cell in order to avoid the D2D transmissions causing interference into the normal cellular communication. In other words, when two devices are attempting to perform the D2D communication within the coverage of the cellular network, the cellular activity on the radio spectrum can be coordinated with the D2D activity on the same radio spectrum.

When the UE transmits D2D data to another UE, the D2D data is transmitted on the same carrier frequency as the UE would use to transmit to the network. In addition, D2D transmissions and D2D receptions can occur on the uplink portion of the network's spectrum. Therefore, the UE transmits or receives D2D data on what would normally be the uplink of the UE's transmit spectrum. Since the network can schedule uplink transmissions for various UEs in the cell, the network has to ensure that these D2D transmissions do not collide or interference with uplink transmissions from the UE that are scheduled by the network (since the cellular activity and the D2D activity occur on the same spectrum).

In one example, the coordination between the cellular activity and the D2D activity can be achieved using D2D resource allocation mode 1, in which the transmitting UE requests transmission resources for D2D transmissions from the network. The UE can request the transmission resources in a manner similar to when the UE requests transmission resources for typical UE-to-network transmissions. For example, a request for transmission resources can typically occur by the UE sending a media access control (MAC) layer buffer status report (BSR) to an evolved node B (eNB), and the eNB can respond with the assigned resources in the form on an uplink (UL) grant signaled within the physical layer.

In D2D resource allocation mode 1, the eNB can be actively involved in scheduling the time and frequency at which the UE performs the D2D transmissions. In an alternative scenario, the UE can perform the D2D transmissions using a D2D resource allocation mode 2, in which the UE is more autonomous in performing the D2D transmissions. D2D resource allocation mode 2 may occur when the UE is outside coverage of the eNB, but can also occur when the UE is within coverage. In mode 2, the eNB can reserve a certain potion of its resources and then allows the UE to autonomously choose where to transmit D2D data within that reserved portion. Since the resources are reserved for the D2D communications in a rather static manner, a waste of resources can occur when all of the reserved resources are not be used. In contrast, D2D resource allocation mode 1 allows the network to dynamically allocate resources when D2D transmissions are imminent, thereby providing a more efficient solution. If there are no UEs that desire to perform D2D transmissions, then resources are not unnecessarily assigned for D2D transmissions and available for normal cellular communications.

In one example, D2D resource allocation mode 1 can be used when the UE is in RRC_CONNECTED. In other words, there is an active connection between the UE and the eNB. In addition, the UE is to remain in RRC_CONNECTED for the duration of the D2D activity. The eNB can use this connection for assigning resources to the UE to enable the UE to perform the D2D transmissions. The UE is to be in RRC_CONNECTED because both the MAC layer and the physical layer signaling can rely on the UE having an assigned Cell Radio Network Temporary Identifier (C-RNTI). In addition, the UE being in RRC_CONNECTED can allow the eNB to configure the UE with parameters to control the UE's buffer status reporting behavior. However, traditional processes for transitioning the UE from an RRC idle mode to the RRC connected mode involving both the non-access stratum (NAS) and access stratum (AS) layers is not suitable for the D2D scenario.

FIG. 1 illustrates a legacy technique for establishing a radio resource control (RRC) connection for a user equipment (UE) 140. When the UE 140 has cellular data to send to the network, a number of steps can be performed by entities within the UE 140 in order to move the UE 140 from a radio resource control (RRC) idle mode to an RRC connected mode. The UE 140 can communicate the data to an evolved node B (eNB) upon transitioning into the RRC connected mode. The entities within the UE 140 can include applications 120, an Internet Protocol (IP) stack 122, a radio access bearer (RAB) manager 124, a non-access stratum (NAS) layer 126, an RRC layer 128, signaling radio bearers 130, cellular radio bearers 132 and a physical layer 134.

The UE 140 can initially be in RRC idle mode. When the UE 140 is in the RRC idle mode, no cellular radio bearers (or data radio bearers) exist and no user data can be transferred from the UE 140 to the network.

In step 102, an application 120 in the UE 140 can generate user data for transmission. The application 120 can pass the data to the IP stack 122 for transmission, wherein the data is then passed to the RAB manager 124.

In step 104, the RAB manager 124 can track whether appropriate radio bearers exist in the UE 140. When the RAB manager 124 detects that no radio bearers are established for the UE 140, the RAB manager 124 can send a request to the NAS layer 126 for creation of the radio bearers.

In step 106, the NAS layer 126 can initiate a service request procedure that requests the network to establish the radio bearers. In order to perform the service request procedure, the NAS 126 can provide a service request message to the RRC layer 128 in the access stratum. The service request message can request establishment of an RRC connection for the UE 140.

In step 108, the RRC layer 128 can perform an RRC connection establishment procedure with the eNB, which can result in creation of the signaling radio bearer 130. The signaling radio bearer 130 can be used to send a NAS service request message to the network.

In step 110, in response to receiving the NAS service request message, the network can initiate various actions for establishing the cellular radio bearers 132 (or data radio bearers) for the UE 140. For example, the network can instruct the UE 140, via RRC signaling, to establish the cellular radio bearers 132 and then the RRC 128 can setup those cellular radio bearers 132 in the UE 140. User data can subsequently transmitted from the UE to the network using the cellular radio bearers 132. Therefore, when no radio bearers are established for the UE 140, the UE 140 is to enter into an RRC connected mode for creation of those radio bearers. In addition, the network can perform other actions, such as an establishment of security for the UE 140.

The process described above for establishing the RRC connection for the UE is not directly suitable for D2D communication. In contrast to cellular radio bearers, the D2D radio bearers can already exist when the UE is in idle mode, e.g., because the UE was using the D2D radio bearers while it was out of network coverage. Thus, the RAB manager function in the legacy system, which triggers the NAS to perform the service request whenever there is data to be sent but there are no established radio bearers, is difficult to apply to D2D. The decision on whether the UE is to use D2D resource allocation mode 1, and therefore be moved into RRC_CONNECTED, can depend on access stratum specific information that would not normally be available to the NAS layer when deciding to trigger the service request procedure.

In previous solutions, the RAB manager can request the NAS to establish the radio bearers, which in turn causes the NAS to request establishment of the RRC Connection. However, this previous solution is not directly applicable to the D2D case because the D2D radio bearers can already exist. In other words, the D2D radio bearers can already be in use when the UE determines that D2D resource allocation mode 1 is to be used. The D2D radio bearers can exist even when the UE is in the RRC idle mode. In one example, the UE could initially be out of network coverage and using D2D resource allocation mode 2 for D2D transmission, whereby the UE autonomously selects transmission resources from a configured pool of resources. The UE can subsequently move into network coverage of a cell in which D2D resource allocation mode 1 is to be used. However, the D2D bearers were previously established when the UE was outside of network coverage, and the UE does not have to reestablish the D2D bearers upon entering into network coverage. Therefore, the previous function of the RAB manager (e.g., observing data that arrives and initiating appropriate protocols for establishing an RRC connection when radio bearers do not exist for the UE) do not directly apply when the D2D radio bearers are already existent at the UE.

The technology described herein is for establishing an RRC connection for the UE to enable the UE to perform D2D communication. For example, the UE can perform the D2D communication with a target UE. When the UE is in an RRC idle mode, D2D data for transmission on a D2D radio bearer can be received at the UE from upper layers (e.g., from an application running on the UE). The UE can check certain conditions to determine whether D2D resource allocation mode 1 is to be used. If mode 1 does not need to be used, then the UE can transmit the data to the target UE via the D2D radio bearer (even when the UE is in RRC idle mode). On the other hand, if mode 1 is to be used for communicating the data, then a UE access stratum can request a UE NAS to move the UE from the RRC idle mode into an RRC connected mode. The UE NAS can initiate a service request procedure to move the UE from the RRC idle mode to the RRC connected mode. In a configuration that is alternative to the service request procedure, the UE NAS can initiate a tracking area updating procedure with an "active" flag set in a tracking area update request, which can enable establishment of the RRC connection for the UE.

In one example, whether the UE is to transition to the RRC connected mode in order to perform the D2D transmission can depend on a type of resource allocation being used in the network. For example, the UE is to move into the RRC connected mode when the network is using D2D resource allocation mode 1. On the other hand, the UE may not enter the RRC connected mode when the network is using D2D resource allocation mode 2.

Figure 2:
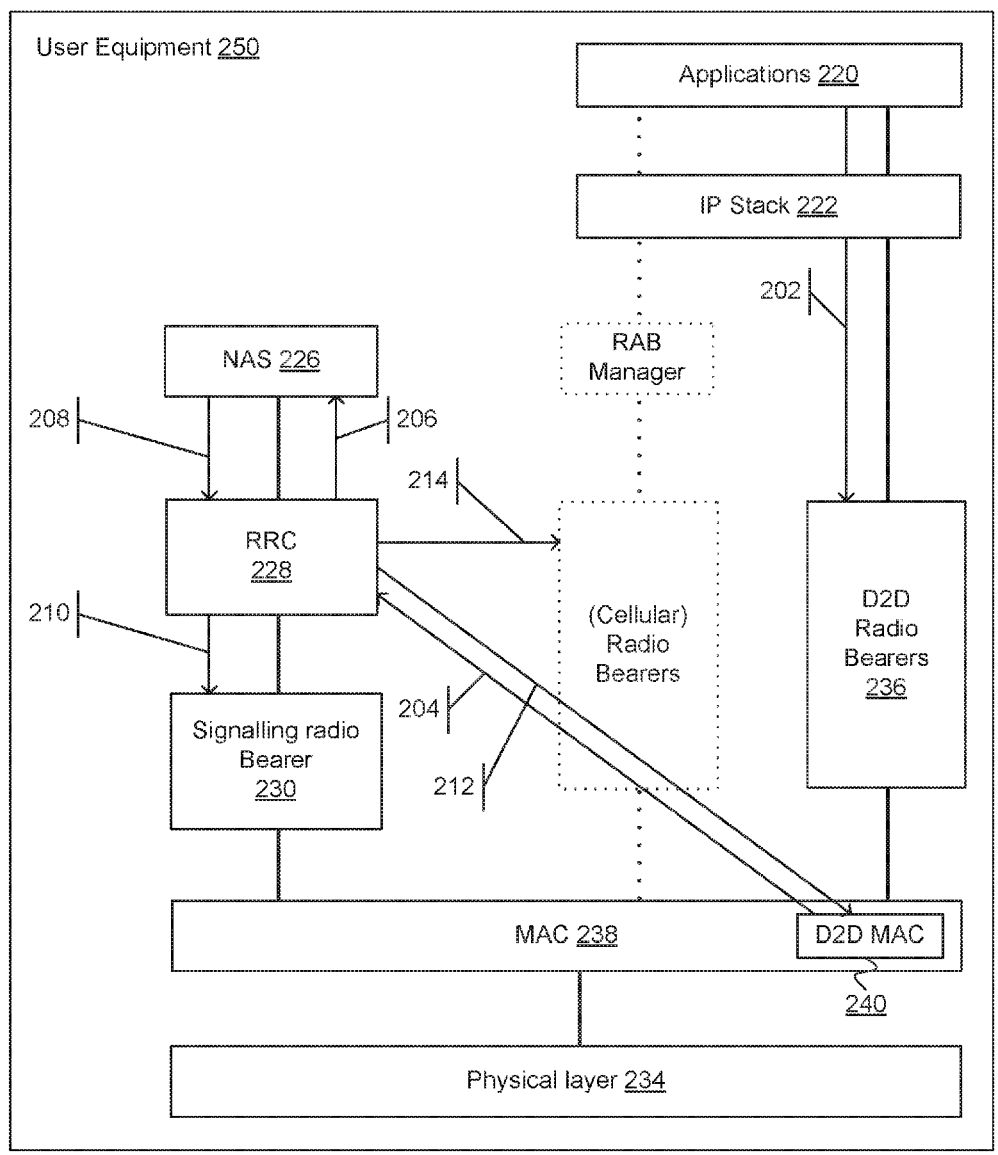
FIG. 2 illustrates establishing a radio resource control (RRC) connection for a user equipment (UE) to enable the UE to perform a device-to-device (D2D) communication in accordance with an example.

FIG. 2 illustrates establishing a radio resource control (RRC) connection for a user equipment (UE) 250 to enable the UE 250 to perform a device-to-device (D2D) communication. When the UE 250 has D2D data to send to another UE (e.g., a target UE or a receiving UE), a number of steps can be performed by entities within the UE 250 in order to move the UE 250 from a radio resource control (RRC) idle mode to an RRC connected mode. The UE 250 can move to the RRC connected mode when the UE 250 is to use D2D resource allocation mode 1 to perform the D2D transmission. Upon moving into the RRC connected mode, the UE 250 can request resources to transmit the D2D data to the target UE. The entities within the UE 250 can include applications 220, an Internet Protocol (IP) stack 222, a non-access stratum (NAS) layer 226, an RRC layer 228, signaling radio bearers 230, a physical layer 234, D2D radio bearers 236, a media access control (MAC) layer 238, and a D2D MAC layer 240. In this example, the UE 250 may not include a radio access bearer (RAB) manager. Alternatively, the UE 250 may include the RAB manager, but the RAB manager is not used for performing D2D transmissions.

The UE 250 can initially be in RRC idle mode. When the UE 140 is in the RRC idle mode, no cellular radio bearers exist and no user data can be transferred from the UE 140 to the network. However, D2D radio bearers may exist for the UE 250. The D2D radio bearers may have already been used by the UE 250 for transmitting and receiving D2D data.

In step 202, an application 220 in the UE 250 can generate user D2D data for transmission. The application 220 can pass the D2D data to the IP stack 222 for transmission. The IP stack 222 can pass the D2D data to the D2D radio bearers 236 for transmission and the D2D radio bearers 236 can notify the MAC layer 238, or more specially the D2D MAC 240 functionality in the MAC layer, that there is D2D data pending for transmission.

In step 204, the MAC layer 238 of the UE 240 can indicate to the RRC layer 228 that D2D data is pending transmission. In one example, the MAC layer 228 is a single entity that is used by all radio bearers to access the radio. The D2D MAC 240 can represent the functionality of the MAC layer 238 that is related to D2D communication. In alternative examples, other layers within the UE 250 can indicate the pending D2D data transmission to the RRC layer 228, such as a radio link control (RLC) layer or a packet data convergence protocol (PDCP) layer within the UE 250.

In step 206, prior to transmission of the D2D user data, the RRC layer 228 of the UE 250 can check whether the UE 250 is to use D2D resource allocation mode 1 or whether the UE 250 can use resource allocation mode 2. In one example, the UE 250 can determine which mode is to be used based on a system information block (SIB) message previously broadcasted from the network. If the UE 250 determines that resource allocation mode 1 is to be used, then the RRC layer 228 can request the NAS layer 226 to move the UE 250 into the RRC connected mode. In other words, if resource allocation mode 1 is to be used, then the UE 250 is to enter the RRC connected mode in order for the D2D data transmission to occur.

In step 208, the NAS layer 226 of the UE 250 can receive the request to move the UE 250 into the RRC connected mode from the RRC layer 228 of the UE 250. The NAS layer 226 can initiate a service request procedure. The service request procedure can result in an establishment of the cellular radio bearers for the UE 250. In order to perform the service request procedure, the NAS layer 226 can provide a service request message to the RRC layer 228 in the access stratum. The service request message from the NAS layer 226 can request the RRC layer 228 to establish an RRC connection for the UE 250. In an alternative example, rather than performing the service request procedure, the NAS layer 226 of the UE can initiate a tracking area updating procedure with "active" flag set in the tracking area update request. As a result, the RRC layer 228 of the UE 250 can be notified to establish the RRC connection for the UE 250.

In step 210, the RRC layer 228 of the UE 250 performs an RRC connection establishment procedure with an evolved node B (eNB). As a result, the RRC connection can be established for the UE 250 and the signaling radio bearer 230 for the UE 250 can be created. In other words, the UE 250 can switch to being in the RRC connected mode upon completion of the RRC connection establishment procedure. The signaling radio bearer can then be used to send a NAS Service Request message to the network.

In step 212, once the UE 250 is in the RRC connected mode, the RRC layer 228 can indicate to the MAC layer 238 that the UE 250 is in RRC_CONNECTED. The RRC layer 228 can indicate that the UE 250 is to proceed with performing a D2D transmission using D2D resource allocation mode 1. This indication can include various configuration parameters that are specific to D2D resource allocation mode 1. For example, the indication from the RRC layer 228 to the MAC layer 238 can include a periodic D2D BSR timer and a D2D BSR retransmission timer. In one example, the RRC layer 228 can receive the various configuration parameters that are specific to D2D resource allocation mode 1 from the eNB upon establishment of the RRC connection. The UE 250 can now use the D2D resource allocation mode 1 for sending MAC layer buffer status reports (BSRs) to the eNB. In other words, the MAC layer 238 can send the BSRs to the eNB using the various configuration parameters (e.g., periodic D2D BSR timer, D2D BSR retransmission timer). The eNB can respond with uplink (UL) grants, and thereafter, the UE 250 can transmit the D2D data using those UL grants. In other words, the UL grants can inform the UE 250 at which time and at which frequency the UE 250 is to perform the D2D transmission, such that the UE's D2D transmission does not coincide with other previously scheduled cellular transmissions (i.e., data sent from the UEs to the network). This process can involve using the D2D radio bearers to perform the D2D transmission (i.e., not the cellular radio bearers), and substantially no further interaction needs to occur between the NAS layer 226 and the RRC layer 228. The UE 250 can continue to use this process for as long as the UE 250 has D2D data to transmit and remains in RRC_CONNECTED.

In step 214, in response to receiving the NAS Service Request message, the network can initiate various actions for establishing the cellular radio bearers. However, establishment of the cellular radio bearers do not affect the D2D data that is sent using the D2D bearers. An example action can include establishing access stratum security, which protects the signaling radio bearer 230, as well as cellular radio bearers that are subsequently established. However, the access stratum security is not used to protect the D2D radio bearers, which have a separate security protection that can operate irrespective of whether the UE 250 is in RRC_IDLE or RRC_CONNECTED. In addition, the network can instruct the UE 250, via RRC signaling, to establish the cellular radio bearers. The RRC layer 228 of the UE 250 can subsequently function to set up those cellular radio bearers.

In some examples, determining whether the UE is restricted in using resource allocation mode 1 can be performed in a number of manners. For example, if the UE is camped on a suitable cell (i.e., implying that the UE is within network coverage) then resource allocation mode 1 is to be used. In another example, if a signal level is above a configured threshold, then resource allocation mode 1 is to be used. The signal level can be based on reference symbol received power (RSRP) measurements or reference symbol received quality (RSRQ) measurements. In yet another example, whether the serving cell indicates in system information that D2D communication is supported within the serving cell's coverage can be determined. This indication can be implicitly indicated by the presence of a system information block (SIB) that is specific to D2D, or it could be implicitly indicated by the presence of specific D2D related parameters with the system information. For example, this indication can be implicitly indicated by the presence of D2D resource pool information. In addition, the system information from the serving cell can explicitly indicate that the UE is restricted to using resource allocation mode 1 within that serving cell. The system information can be broadcast from the eNB to the UE. In an additional example, the serving cell can indicate that D2D UEs are to establish a connection with the eNB (i.e., move into the RRC connected mode), upon which the UE is informed via dedicated signaling from the eNB of whether the UE is to use D2D resource allocation mode 1 or mode 2. In this approach, the eNB can determine whether the UE is to use D2D resource allocation mode 1 or mode 2, rather than the UE.

As previously discussed, the MAC layer can inform the RRC layer of the pending D2D data transmission. The RRC layer can evaluate certain conditions (e.g., whether the UE is to use resource allocation mode 1), and depending on whether these conditions are satisfied, the RRC layer can request the NAS layer to be moved into the RRC connected mode. In alternative configurations, these conditions can be evaluated in other locations within the UE, such as the PDCP layer, the MAC layer or within an upcoming layer or function within the UE. In addition, the evaluation of the conditions can be distributed between different entities within the UE.

As previously discussed, the UE can determine that resource allocation mode 1 is to be used, and as a result, the RRC layer can request the NAS layer to move the UE into RRC_CONNECTED. In an alternative scenario, the UE can determine that D2D resource allocation mode 2 is to be used. In this case, the RRC layer can respond to the MAC layer with an indication that D2D resource allocation mode 2 is to be used, and the other steps of the process described above are not relevant.

In one configuration, the UE does not determine to use D2D resource allocation mode 1 or mode 2, but rather simply determines that the UE is to enter RRC_CONNECTED. In this case, the eNB can decide whether the UE is to use D2D resource allocation mode 1 or mode 2. This decision can be informed to the UE in either a RRC CONNECTION SETUP message or an RRC CONNECTION RECONFIGURATION message. In particular, the eNB's decision on whether the UE is to use D2D resource allocation mode 1 or mode 2 can be communicated to the MAC layer of the UE.

In one configuration, the RRC does not determine that resource allocation mode 1 is to be used and that an RRC connection is to be established for the UE. Rather, the RRC layer can provide an indication to the NAS layer that an RRC connection may be needed for performing the D2D communication. In addition, the RRC layer can provide the NAS layer with the necessary parameters to enable the NAS layer to decide whether to initiate the service request procedure, and hence request establishment of the RRC connection. In other words, the NAS layer can determine whether resource allocation mode 1 is to be used, as opposed to the RRC layer.

In one configuration, a purpose for moving the UE from RRC_IDLE mode into RRC_CONNECTED mode can be included in messaging between the MAC layer, the NAS layer and/or the RRC layer. This purpose (i.e., D2D transmission) can also be provided to the eNB, either within a RRC connection request message (e.g., as a novel 'establishment cause' value such as 'D2D' or 'D2D communication'), or in a RRC connection setup complete message (e.g., in a novel 'D2D transmission request' information element). The RRC connection request message and the RRC connection setup complete message can both be part of the RRC connection establishment procedure. An advantage of including such an indicator is that the eNB can learn that the UE is to use D2D resource allocation mode 1, and hence the eNB can automatically provide applicable configuration parameters associated with resource allocation mode 1. In one example, the eNB can provide the configuration parameters (e.g., a periodic D2D BSR timer, a D2D BSR retransmission timer) in a RR connection reconfiguration message. Another advantage of using a novel D2D specific establishment cause in the RRC connection request message is that, in cases where the eNB is under heavy load, the eNB can prioritize or deprioritize connection establishments for the purpose of D2D communication. For example, if D2D is being used by public safety users within a network, then the eNB can choose to accept connection establishments for D2D purposes. On the other hand, if D2D is being used as a service by non-public safety users within the network, then the eNB can choose to reject connection establishments for D2D purposes.

In one example, the establishment of the cellular radio bearers (or data radio bearers) is not essential for the purpose of transmitting D2D user data. In other words, the D2D transmission can be successfully performed upon receiving uplink grants from the eNB, wherein the uplink grants indicate certain times at which the UE is allowed to perform the D2D transmission. However, using a legacy service request procedure can result in the cellular radio bearers being established, even though there is no cellular data waiting to be transmitted.

In one configuration, the NAS layer can initiate a tracking area update procedure (without the 'active' flag set) instead of the service request procedure. The tracking area update procedure can result in the UE being moved into RRC_CONNECTED without the cellular radio bearers being established. This configuration can be advantageous because the cellular radio bearers are not essential for the purpose of transmitting D2D user data, and hence non-essential operations can be avoided. However, this configuration can also be disadvantageous because access stratum security would not be started, and as a result, the RRC signaling on the signaling radio bearer would not have security protection. In addition, handover of the RRC connection to another eNB would not be possible because legacy versions of the 3GPP LTE specification only permit handover after the cellular user plane is established. Another aspect is that the mobility management entity (MME) typically initiates release of the RRC connection shortly after the tracking area update procedure (without the active flag), which is in contrast to situations when cellular radio bearers have been established and then the eNB decides (typically based on lack of UE activity) when the RRC connection is to be released.

In one configuration, the cellular radio bearers can be established for the UE, and then the UE can send the buffer status reports (BSRs) using the various configuration parameters (e.g., periodic D2D BSR timer expiry, a D2D BSR retransmission timer). In other words, the cellular radio bearers can be established before the UE receives the uplink grants from the eNB. This configuration can be advantageous because if the cellular radio bearers were to be established before the D2D transmission, then access stratum security can be established before the eNB sends RRC signaling including the configuration parameters related to the D2D resource allocation mode 1. The establishment of the access stratum security before the eNB sends the RRC signaling can be a preference of the network operator.

Figure 3:
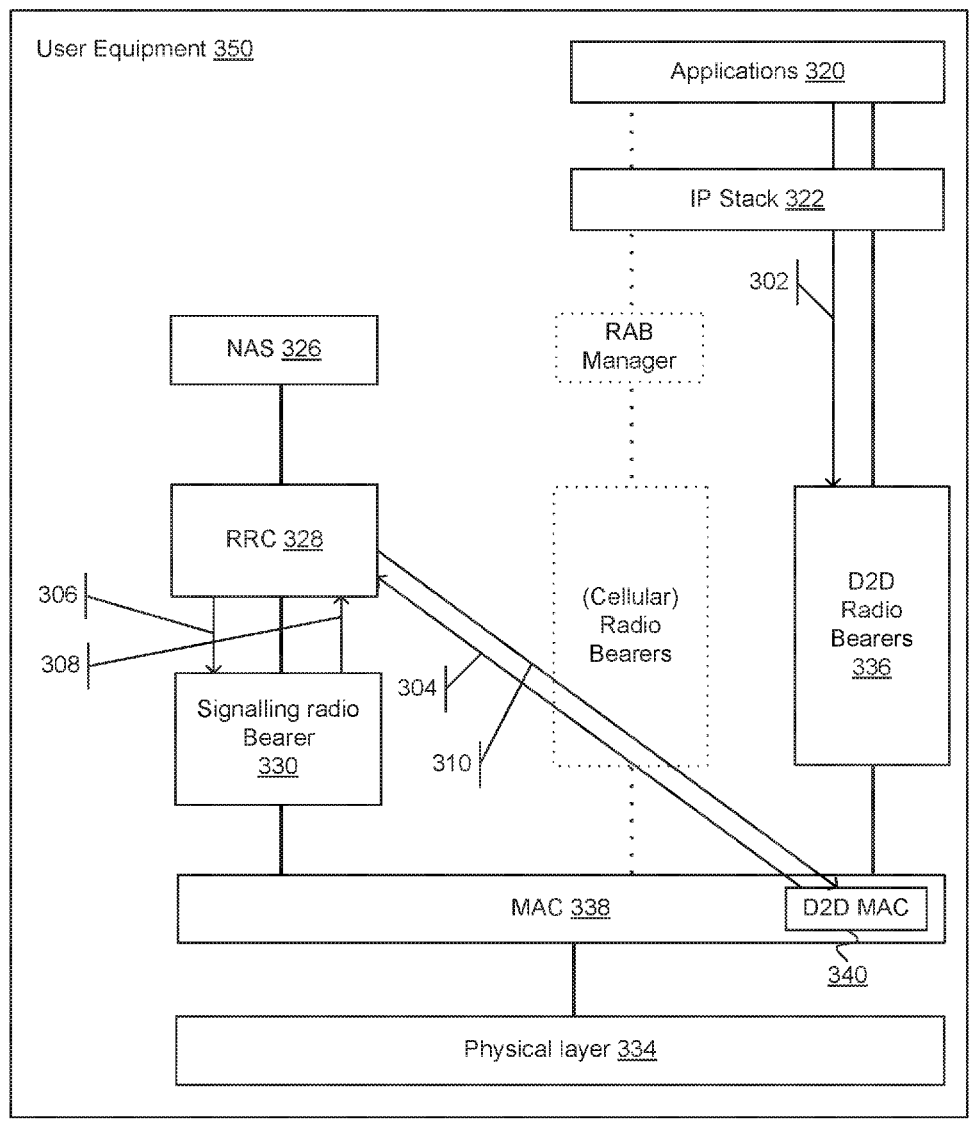
FIG. 3 illustrates configuring a user equipment (UE) to perform a device-to-device (D2D) communication when the UE is in a radio resource control (RRC) connected mode with an evolved node B (eNB) in accordance with an example.

FIG. 3 illustrates configuring a user equipment (UE) 350 to perform a device-to-device (D2D) communication when the UE 350 is in a radio resource control (RRC) connected mode with an evolved node B (eNB). When the UE 350 has D2D data to send to another UE (e.g., a target UE or a receiving UE), a number of steps can be performed by entities within the UE 350 in order to perform the D2D transmission. When the UE 350 has D2D data to send to the target UE, the UE 350 can already be in RRC_CONNECTED. However, the UE 350 may not be configured with parameters for D2D resource allocation mode 1 (or mode 2), wherein the UE 350 is to use these parameters in order to perform the D2D transmission. The entities within the UE 350 can include applications 320, an Internet Protocol (IP) stack 322, a non-access stratum (NAS) layer 326, an RRC layer 328, signaling radio bearers 330, a physical layer 334, D2D radio bearers 336, a media access control (MAC) layer 338, and a D2D MAC layer 340.

The UE 350 can initially be in RRC connected mode. When the UE 350 is in the RRC connected mode, cellular radio bearers can already exist for the UE 350. The UE 350 may have originally entered into the RRC connected mode not to perform D2D transmissions, but rather to perform network transmissions, i.e., with the evolved node B (eNB). After the UE 350 has entered the RRC connected mode, the UE 350 can generate D2D data to be sent to another UE. In addition, D2D radio bearers 336 may exist for the UE 350. The D2D radio bearers 336 may have already been used by the UE 350 for transmitting and receiving D2D data at some previous point in time, but not during the current RRC connection. If the D2D radio bearers 336 had already been used during the current RRC connection, than the UE 350 may already be configured for D2D resource allocation mode 1 (or mode 2).

In step 302, an application 320 in the UE 350 can generate user D2D data for transmission. The application 320 can pass the D2D data to the IP stack 322 for transmission. The IP stack 322 can pass the D2D data to the D2D radio bearers 336 for transmission and the D2D radio bearers 336 can notify the MAC layer 338, or more specially the D2D MAC 340 functionality within the MAC layer, that there is D2D data pending for transmission.

In step 304, the MAC layer 338 of the UE 350 can indicate to the RRC layer 328 that D2D data is pending transmission. In one example, the MAC layer 328 is a single entity that is used by all radio bearers to access the radio. The D2D MAC 340 can represent the functionality of the MAC layer 338 that is related to D2D communication. In alternative examples, other layers within the UE 350 can indicate the pending D2D data transmission to the RRC layer 328, such as a radio link control (RLC) layer or a packet data convergence protocol (PDCP) layer within the UE 350.

In step 306, the UE 350 can determine whether D2D resource allocation mode 1 is to be used, or if the UE 350 can use resource allocation mode 2. The UE 350 can determine the appropriate resource allocation mode before the D2D data is transmitted to the target UE. If the UE 350 determines that resource allocation mode 1 is to be used, then the UE 350 can send an RRC request to the network. For example, the RRC layer 328 of the UE 350 can send the RRC request to the eNB. The request message could be a novel message, such as a D2D resource request or a D2D configuration request. A D2D resource request indicator information element (IE) or a D2D configuration request indicator IE can be included in the novel request message. Alternatively, the request message can be an existing message, such as UE ASSISTANCE INFORMATION containing a novel D2D resource request indicator information element (1E) ora D2D configuration request indicator IE. The request message can be sent from the RRC layer 328 to the eNB using the signaling radio bearer (which is already established because the UE 350 is in the RRC connected mode).

In an alternative configuration, the UE 350 does not determine whether to use D2D resource allocation mode 1 or mode 2, but rather determines to send the RRC request to the network. As a result, the eNB can decide whether the UE 350 is to use D2D resource allocation mode 1 or mode 2. The eNB can inform the UE 350 of this decision via signaling from the eNB to the RRC layer 328. If the eNB were to inform the RRC layer 328 that the UE 350 is to use D2D resource allocation mode 2, then the RRC layer 328 can inform the MAC layer 338 to use mode 2 when performing the D2D transmission.

In step 308, the eNB can respond to the RRC request from the RRC layer 328 of the UE 350. The eNB can provide the UE 350 with necessary configuration parameters for D2D resource allocation mode 1. Examples of these configuration parameters can include a periodic D2D BSR timer and a D2D BSR retransmission timer. In one example, the eNB can respond with the configuration parameters in a RRC connection reconfiguration message. If the UE 350 is to use D2D resource allocation mode 2 for performing the D2D transmission, then the RRC connection reconfiguration message can include an instruction to the UE 350 to use D2D resource allocation mode 2.

In step 310, the RRC layer 328 can indicate to the MAC layer 338 that the UE 350 is in RRC_CONNECTED, and that the UE 350 is to proceed with performing the D2D transmission using D2D resource allocation mode 1. In addition, the RRC layer 328 can provide the MAC layer 338 with the necessary configuration parameters for using D2D resource allocation mode 1 to perform the D2D transmission. The UE 350 can use the configuration parameters for sending MAC layer buffer status reports (BSRs) to the eNB. In other words, the MAC layer 338 can send the BSRs to the eNB using the various configuration parameters (e.g., periodic D2D BSR timer, D2D BSR retransmission timer). The eNB can respond with uplink (UL) grants, and thereafter, the UE 350 can transmit the D2D data using those UL grants. In other words, the UL grants can inform the UE 350 at which time and at which frequency the UE 350 is to perform the D2D transmission, such that the UE's D2D transmission does not coincide with other previously scheduled cellular transmissions (i.e., data sent from the UEs to the network).

Figures 4, 5:
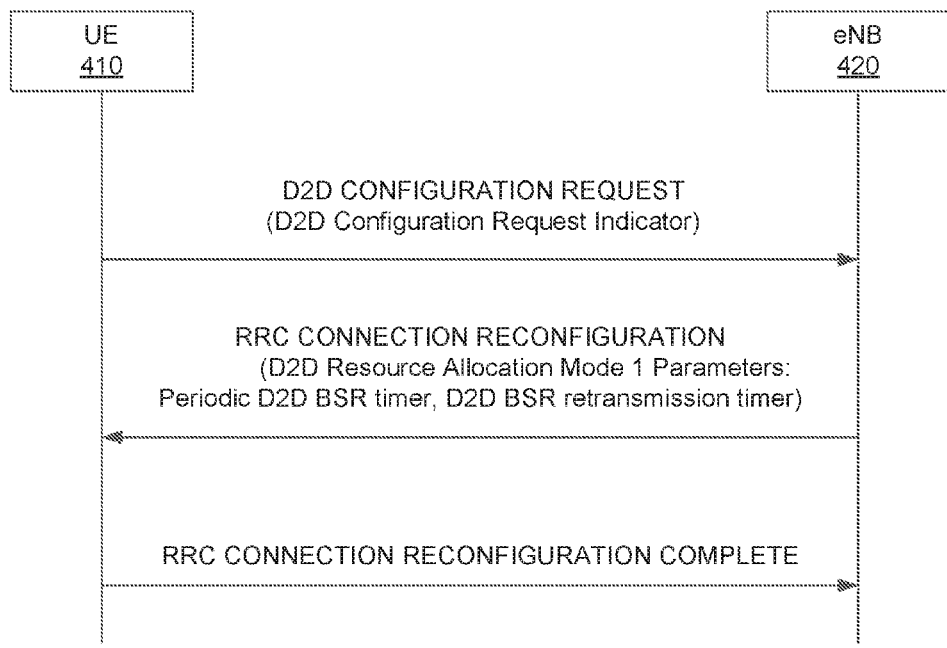
FIG. 4 illustrates signaling between a user equipment (UE) and an evolved node B (eNB) for configuring the UE to perform a device-to-device (D2D) communication in accordance with an example.
FIG. 5 illustrates an abstract syntax notation (ASN) code example of access class barring parameters for device-to-device (D2D) communications in a system information block 2 (SIB2) message in accordance with an example.

FIG. 4 illustrates exemplary signaling between a user equipment (UE) 410 and an evolved node B (eNB) 420 for configuring the UE 410 to perform a device-to-device (D2D) communication. The UE 410 can send a D2D configuration request message to the eNB 420. In one example, the D2D configuration message can be sent to the eNB 420 using the UE's signaling radio bearer. The D2D configuration message can include a D2D configuration request indicator information element (IE). The eNB 420 can respond with an RRC connection reconfiguration message to the UE 410. The RRC connection reconfiguration message can include various D2D resource allocation mode 1 parameters, such as a periodic D2D BSR timer and a D2D BSR retransmission timer. In other words, these reconfiguration parameters can allow the UE 410 to use D2D resource allocation mode 1 for sending D2D transmissions. The UE 410 can send an RRC connection reconfiguration complete message to the eNB 420 in response to receiving the RRC connection reconfiguration message.

In one example, the UE 410 and the eNB 420 can perform a similar radio interface message exchange as described above when the UE 410 is originally in RRC idle mode (as opposed to being in RRC connected mode). When the UE 410 is in the RRC idle mode, the UE 410 does not indicate its desire to perform a D2D communication to the eNB 420 as described above, that is in order to notify the eNB of the UE's desire to perform the D2D communication, the UE can use a novel 'establishment cause' value in the RRC Connection Request message or a novel indicator in the RRC Connection Setup Complete message. Rather, once the UE 410 has successfully entered RRC_CONNECTED, then the UE 410 can inform the eNB 420 that it wishes to perform a D2D communication by sending an RRC request message (e.g., D2D CONFIGURATION REQUEST) to the eNB 420. At this point, the UE 410 can send the D2D configuration request message to the eNB 420, the eNB 420 can send an RRC connection reconfiguration message to the UE 410, and the UE 410 can send an RRC connection reconfiguration complete message to the eNB 420.

FIG. 5 illustrates an abstract syntax notation (ASN) code example of access class barring (ACB) parameters for device-to-device (D2D) communications that can be included in a system information block 2 (SIB2) message. In previous versions of the 3GPP LTE standard, the network can restrict RRC connection setup request attempts by using access class barring (ACB). As a part of D2D, it can be beneficial to extend this mechanism, such that the eNB can prohibit the UE from sending a RRC connection request for purposes of D2D resource allocation. ACB parameters specific to D2D can be added to the System Information Block 2 (SIB2), as shown in FIG. 5. For example, a parameter of ac-BarringForD2D-r12 can be added to the SIB2 for setting up the ACB configuration.

With access class barring, the network may wish to set different barring configurations depending on whether the UE is accessing the network for the purpose of D2D, or the whether the UE is accessing the network for normal traffic purposes (e.g., voice calls, data transfers). If the network is overloaded and D2D is being used by public safety users, then D2D can be prioritized, but access barring can be applied to the non-D2D traffic. If the D2D is being used for other purposes (e.g., photo sharing, video sharing), then UE-to-network traffic can be prioritized instead of device-to-device traffic.

If the UE receives the ACB configuration in SIB2, and evaluates that access to the cell is barred for a specific RRC Connection Establishment attempt, then the RRC layer of the UE informs upper layers of the UE about the failure to establish the RRC connection due to access barring for D2D resource allocation being applied to the UE. In particular, the RRC layer can inform the upper layers of the ac-BarringForD2D parameter from the SIB2, upon which the RRC establishment procedure ends. In one example, the UE can use resource allocation mode 2 if the RRC connection establishment procedure cannot be successfully completed due to barring. In another example, support for resource allocation mode 1 can be disabled via the system information block (SIB). In this example, changing the SIB (such that mode 1 is disabled) does not affect on-going D2D transmissions, i.e., the UE which already uses resource allocation mode 1 in RRC connected mode can continue sending D2D BSRs for resource allocation until the eNB configures the UE to use resource allocation mode 2 or releases the RRC connection.

In one configuration, the RRC connection can be released due to inactivity. In previous LTE systems, the eNB can trigger the release of the RRC Connection when it has observed inactivity on the cellular radio bearers (and sometimes the signaling radio bearers) for a certain period of time, otherwise known as the "inactivity time". With D2D communication using resource allocation mode 1, the UE is to remain in RRC_CONNECTED for as long as the D2D communication is ongoing in order to allow the UE to continue to request transmission resources. The eNB does not have any visibility of activity on the D2D radio bearers that reside only within the UEs, and hence an eNB observing inactivity on the cellular radio bearers can mistakenly decide to release the RRC Connection of a UE before it has completed its D2D communication. This problem can be addressed by the eNB observing D2D related MAC activity, such as the reception of a D2D BSR. Therefore, the RRC Connection for a particular UE can be released when the eNB has observed inactivity on the cellular radio bearers (and sometimes the signaling radio bearers) and no D2D BSR reception for a certain period of time. This additional condition for UE inactivity detection can be applied to those UEs which the eNB has configured to use D2D resource allocation mode 1.

Therefore, the RRC connection is not released due to inactivity of the UE, but rather inactivity at the eNB with respect to that particular UE. In previous systems, the eNB can release the RRC connection after a defined period of non-activity at the UE, but for D2D, the situation is different because the eNB cannot actually observe the D2D communication. Since the D2D data is transferred directly between the UE and the target UE, the eNB does not exactly know when the D2D transmission occurs. However, if the UE uses resource allocation mode 1, then the eNB can detect when the UE sends the buffer status reports (BSRs). The UE can send the BSRs in order to request resources for performing the D2D transmissions. Thus, the eNB can indirectly determine (through the BSRs) whether the UE is actively sending D2D transmissions. If the eNB does not detect BSRs from the UE for a certain period of time, the eNB can infer that the UE is inactive (in terms of D2D transmissions), and the eNB can release the RRC connection with the UE.

D2D discovery is a process whereby UEs can become aware of other UEs that are within close proximity. The D2D discovery process can involve the transmission of discovery signals and messages. The D2D discovery process can be applicable when the UE is within coverage of the network. Similar to D2D communication resource allocation mode 1, D2D discovery has a resource allocation type 2 in which the UE is to be in RRC_CONNECTED in order to request transmission resources. Thus, similar mechanisms to those described above for D2D communication can apply to the process of D2D discovery. However, a difference with D2D discovery is that the D2D discovery protocol (also referred to as the ProSe Discovery Protocol or the ProSe Protocol) resides outside of the access stratum and may be more closely linked to the NAS protocols. Therefore, the D2D discovery protocol can directly request the NAS to initiate a procedure to move the UE to RRC_CONNECTED prior to the D2D discovery protocol generating messages, rather than using the arrival of those messages within the access stratum to trigger the process.

The conditions for whether the UE is to enter RRC_CONNECTED can include various access stratum parameters that are typically not available to the NAS. These parameters can be from system information, such as an indication of whether the UE is to use D2D discovery resource allocation type 1 or type 2. Since the NAS does not typically have these parameters, the RRC layer can provide these parameters to the NAS layer. Thus, the NAS layer can determine whether to use D2D discovery resource allocation type 1 or type 2 prior to initiating a service request procedure. Alternatively, the RRC layer can provide these parameters to the D2D discovery protocol, so that the D2D discovery protocol can determine whether the UE is to use D2D discovery resource allocation type 1 or type 2 prior to requesting the NAS to initiate the RRC connection setup procedure.

In one example, the UE can perform cell selection or reselection by performing measurements on neighboring cells, and then attempting to reselect the cells that operate on a frequency with a highest priority. An indication for which frequency (or frequencies) has the highest priority can be provided to the UE via a system information block (SIB) or through dedicated signaling. This cell reselection priority can be used to manage radio access technologies (RATs), carrier frequency or cell loading in different deployment scenarios. However, D2D may not be supported in all carrier frequencies. Based on the operator's decision, the cells of some carrier frequencies may support D2D, and the operator can assign a resource pool for D2D in those cells. In this case, it can be beneficial for the D2D UE to consider whether a particular carrier frequency supports D2D when the UE performs cell reselection. For example, the UE can prioritize the frequency layer supporting D2D. The information on whether D2D is supported can be included in inter-frequency cell reselection information in SIB5. In another example, the UE can be preconfigured with a list of carrier frequencies supporting D2D, wherein the list can be previously provided by a D2D server. In yet another example, the UE can prioritize carrier frequencies based on whether D2D is supported only when D2D operation is enabled at the UE. Otherwise, the UE can follow a default priority scheme (i.e., a priority scheme in which the UE does not reselect cells based on whether a particular cell supports D2D operation).

Figure 6:
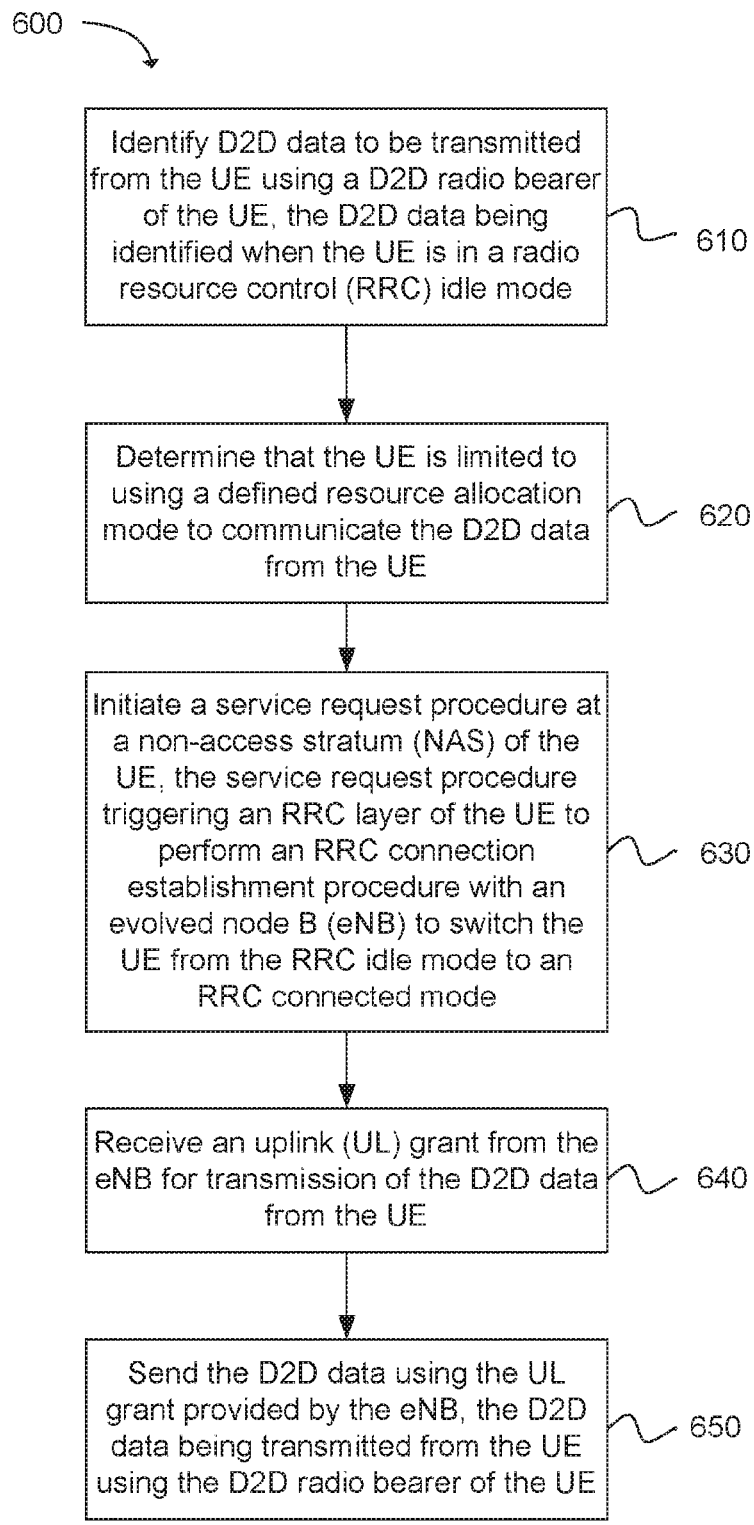
FIG. 6 illustrates functionality of a user equipment (UE) operable to perform device-to-device (D2D) communications in accordance with an example.

Another example provides functionality 600 of a user equipment (UE) operable to perform device-to-device (D2D) communications, as shown in the flow chart in FIG. 6. The functionality can be implemented as a method or the functionality can be executed as instructions on a machine, where the instructions are included on at least one computer readable medium or one non-transitory machine readable storage medium. The UE can include one or more processors configured to identify D2D data to be transmitted from the UE using a D2D radio bearer of the UE, the D2D data being identified when the UE is in a radio resource control (RRC) idle mode, as in block 610. The UE can include one or more processors configured to determine that the UE is limited to using a defined resource allocation mode to communicate the D2D data from the UE, as in block 620. The UE can include one or more processors configured to initiate a service request procedure at a non-access stratum (NAS) of the UE, the service request procedure triggering an RRC layer of the UE to perform an RRC connection establishment procedure with an evolved node B (eNB) to switch the UE from the RRC idle mode to an RRC connected mode, as in block 630. The UE can include one or more processors configured to receive an uplink (UL) grant from the eNB for transmission of the D2D data from the UE, as in block 640. The UE can include one or more processors configured to send the D2D data using the UL grant provided by the eNB, the D2D data being transmitted from the UE using the D2D radio bearer of the UE, as in block 650.

In one example, the one or more processors can be further configured to receive the UL grant from the eNB in response to sending a buffer status report (BSR) from a medium access control (MAC) layer of the UE to the eNB, the BSR being sent to the eNB after the UE has switched to the RRC connected mode. In another example, the one or more processors can be further configured to use one or more configuration parameters associated with the defined resource allocation mode for sending the BSR from the MAC layer of the UE to the eNB, the one or more configuration parameters including at least one of a periodic D2D BSR timer or a D2D BSR retransmission timer.

In one example, the one or more processors can be further configured to perform the RRC connection establishment procedure at the RRC layer of the UE in order to create a signaling radio bearer for the UE. In another example, the one or more processors are further configured to send a service request message to the eNB using a signaling radio bearer of the UE, the service request message for requesting establishment of cellular radio bearers for the UE. In yet another example, the defined resource allocation mode is resource allocation mode 1.

In one example, the one or more processors are further configured to determine that the UE is limited to using the defined resource allocation mode based on a system information block (SIB) broadcast from the eNB. In another example, the D2D radio bearers are present for the UE when the D2D data is identified to be transmitted to the second UE, wherein the D2D radio bearers operate using a defined radio access technology (RAT) standard. In yet another example, the D2D data is generated by a D2D application on the UE.

In one example, the D2D radio bearers are present when the UE is in the RRC idle mode. In another example, the UE can operate in an Evolved Universal Terrestrial Radio Access Network (E-UTRAN). In addition, the one or more processors can be further configured to send an RRC connection request message to the eNB during the RRC connection establishment procedure, the RRC connection request message including an indication that the UE is to switch to the RRC connected mode in order to perform D2D communications. In one configuration, the UE is barred from performing the D2D communications for a defined period of time when the eNB is enforcing access class barring for the UE.

Figure 7:
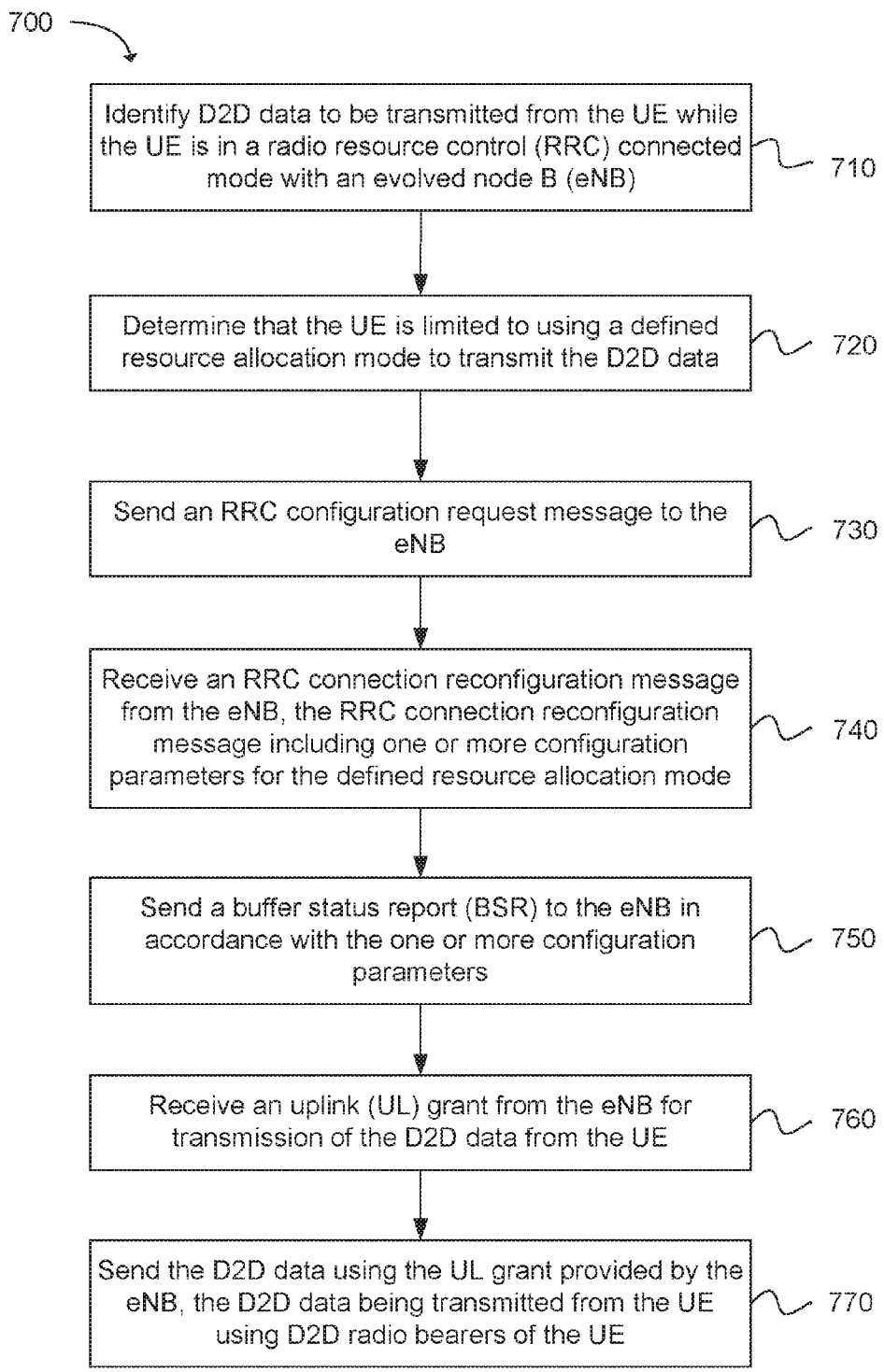
FIG. 7 illustrates functionality of a user equipment (UE) operable to perform device-to-device (D2D) communications in accordance with an example.

Another example provides functionality 700 of a user equipment (UE) operable to perform device-to-device (D2D) communications, as shown in the flow chart in FIG. 7. The functionality can be implemented as a method or the functionality can be executed as instructions on a machine, where the instructions are included on at least one computer readable medium or one non-transitory machine readable storage medium. The UE can include one or more processors configured to identify D2D data to be transmitted from the UE while the UE is in a radio resource control (RRC) connected mode with an evolved node B (eNB), as in block 710. The UE can include one or more processors configured to determine that the UE is limited to using a defined resource allocation mode to transmit the D2D data, as in block 720. The UE can include one or more processors configured to send an RRC configuration request message to the eNB, as in block 730. The UE can include one or more processors configured to receive an RRC connection reconfiguration message from the eNB, the RRC connection reconfiguration message including one or more configuration parameters for the defined resource allocation mode, as in block 740. The UE can include one or more processors configured to send a buffer status report (BSR) to the eNB in accordance with the one or more configuration parameters, as in block 750. The UE can include one or more processors configured to receive an uplink (UL) grant from the eNB for transmission of the D2D data from the UE, as in block 760. The UE can include one or more processors configured to send the D2D data using the UL grant provided by the eNB, the D2D data being transmitted from the UE using D2D radio bearers of the UE, as in block 770.

In one example, the one or more configuration parameters in the RRC connection reconfiguration message include at least one of a periodic D2D BSR timer or a D2D BSR retransmission timer. In another example, the RRC configuration request message includes a D2D resource request indicator information element (IE) or a D2D configuration request indicator IE. In yet another example, the one or more processors can be further configured to send the RRC configuration request message to the eNB using a signaling radio bearer of the UE. In one configuration, the D2D radio bearers are present for the UE when the D2D data is identified to be transmitted to the second UE, wherein the D2D radio bearers operate using a defined radio access technology (RAT) standard.

Figure 8:
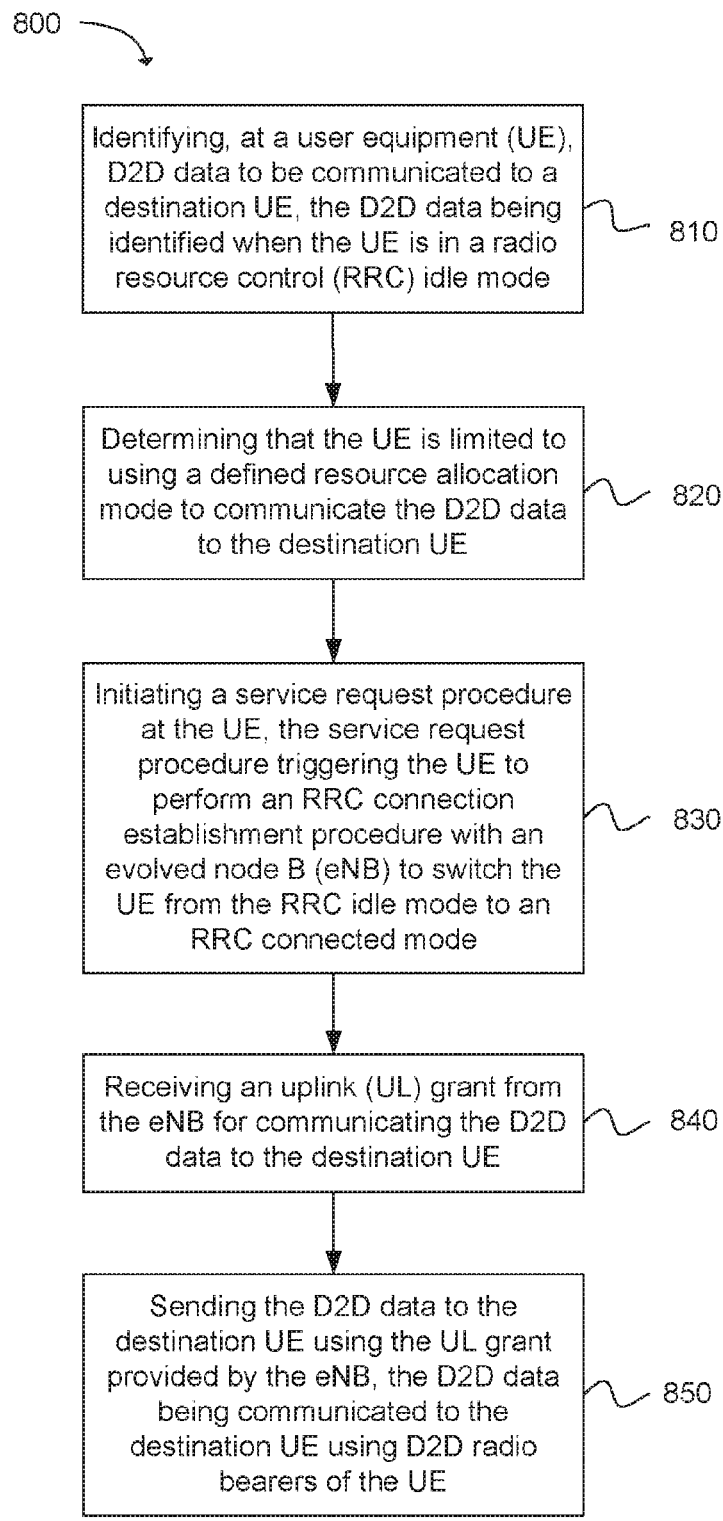
FIG. 8 depicts a flowchart of a method for performing device-to-device (D2D) communications in accordance with an example.

Another example provides a method 800 for performing device-to-device (D2D) communications, as shown in the flow chart in FIG. 8. The method can be executed as instructions on a machine, where the instructions are included on at least one computer readable medium or one non-transitory machine readable storage medium. The method can include the operation of identifying, at a user equipment (UE), D2D data to be communicated to a destination UE, the D2D data being identified when the UE is in a radio resource control (RRC) idle mode, as in block 810. The method can include the operation of determining that the UE is limited to using a defined resource allocation mode to communicate the D2D data to the destination UE, as in block 820. The method can include the operation of initiating a service request procedure at the UE, the service request procedure triggering the UE to perform an RRC connection establishment procedure with an evolved node B (eNB) to switch the UE from the RRC idle mode to an RRC connected mode, as in block 830. The method can include the operation of receiving an uplink (UL) grant from the eNB for communicating the D2D data to the destination UE, as in block 840. The method can include the operation of sending the D2D data to the destination UE using the UL grant provided by the eNB, the D2D data being communicated to the destination UE using D2D radio bearers of the UE, as in block 850.

In one example, the method can include the operation of receiving, at the UE, the UL grant from the eNB in response to sending a buffer status report (BSR) from the UE to the eNB, the BSR being sent to the eNB after the UE has switched to the RRC connected mode. In another example, the method can include the operation of sending the BSR from the UE to the eNB using one or more configuration parameters associated with the defined resource allocation mode, the one or more configuration parameters including at least one of a periodic D2D BSR timer or a D2D BSR retransmission timer. In yet another example, the method can include the operation of sending a service request message from the UE to the eNB using a signaling radio bearer of the UE, the signaling radio bearer being established for the UE during the RRC connection establishment procedure, the service request message for establishing cellular radio bearers for the UE. In addition, the method can include the operation of determining that the UE is limited to using the defined resource allocation mode based on a system information block (SIB) broadcast from the eNB. In one configuration, the method can include the operation of performing cell reselection based on whether neighboring cells of the UE support D2D communications.

Figure 9:
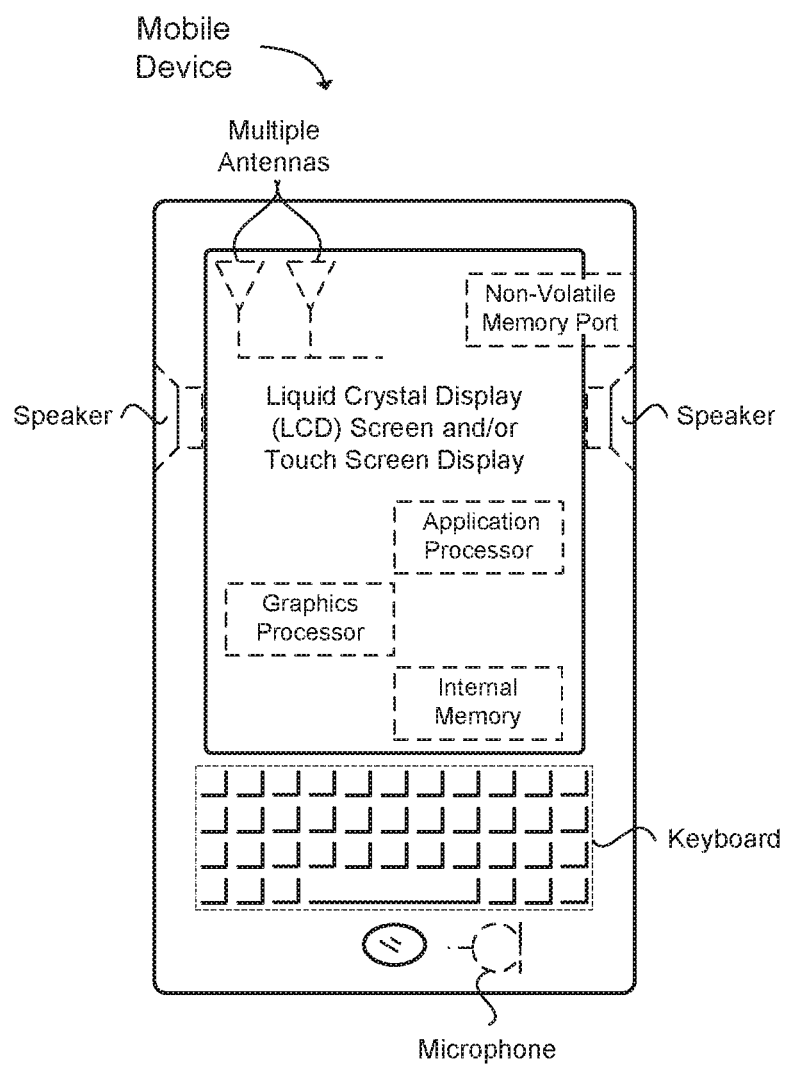
FIG. 9 illustrates a diagram of a wireless device (e.g., UE) in accordance with an example.

FIG. 9 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to perform device-to-device (D2D) communications, the UE having one or more processors configured to:
    identify D2D data to be transmitted from the UE using a D2D radio bearer of the UE, the D2D data being identified when the UE is in a radio resource control (RRC) idle mode;
    determine that the UE is limited to using a defined resource allocation mode to communicate the D2D data from the UE;
    initiate a service request procedure at a non-access stratum (NAS) of the UE, the service request procedure triggering an RRC layer of the UE to perform an RRC connection establishment procedure with an evolved node B (eNB) to switch the UE from the RRC idle mode to an RRC connected mode;
    receive an uplink (UL) grant from the eNB for transmission of the D2D data from the UE;
    receive the UL grant from the eNB in response to sending a buffer status report (BSR) from a medium access control (MAC) layer of the UE to the eNB, the BSR being sent to the eNB after the UE has switched to the RRC connected mode; and
    send the D2D data using the UL grant provided by the eNB, the D2D data being transmitted from the UE using the D2D radio bearer of the UE.

2. The UE of claim 1, wherein the one or more processors are further configured to use one or more configuration parameters associated with the defined resource allocation mode for sending the BSR from the MAC layer of the UE to the eNB, the one or more configuration parameters including at least one of a periodic D2D BSR timer or a D2D BSR retransmission timer.

3. The UE of claim 1, wherein the one or more processors are further configured to perform the RRC connection establishment procedure at the RRC layer of the UE in order to create a signaling radio bearer for the UE.

4. The UE of claim 1, wherein the one or more processors are further configured to send a service request message to the eNB using a signaling radio bearer of the UE, the service request message for requesting establishment of cellular radio bearers for the UE.

5. The UE of claim 1, wherein the defined resource allocation mode is resource allocation mode 1.

6. The UE of claim 1, wherein the one or more processors are further configured to determine that the UE is limited to using the defined resource allocation mode based on a system information block (SIB) broadcast from the eNB.

7. The UE of claim 1, wherein the D2D radio bearers are present for the UE when the D2D data is identified to be transmitted from the UE, wherein the D2D radio bearers operate using a defined radio access technology (RAT) standard.

8. The UE of claim 1, wherein the D2D data is generated by a D2D application on the UE.

9. The UE of claim 1, wherein the D2D radio bearers are present when the UE is in the RRC idle mode.

10. The UE of claim 1, wherein the UE operates in an Evolved Universal Terrestrial Radio Access Network (E-UTRAN).

11. The UE of claim 1, wherein the one or more processors are further configured to send an RRC connection request message to the eNB during the RRC connection establishment procedure, the RRC connection request message including an indication that the UE is to switch to the RRC connected mode in order to perform D2D communications.

12. The UE of claim 1, wherein the UE is barred from performing the D2D communications for a defined period of time when the eNB is enforcing access class barring for the UE.

13. A user equipment (UE) operable to perform device-to-device (D2D) communications, the UE having one or more processors configured to:
    identify D2D data to be transmitted from the UE while the UE is in a radio resource control (RRC) connected mode with an evolved node B (eNB);
    determine that the UE is limited to using a defined resource allocation mode to transmit the D2D data;
    send an RRC configuration request message to the eNB;
    receive an RRC connection reconfiguration message from the eNB, the RRC connection reconfiguration message including one or more configuration parameters for the defined resource allocation mode, wherein the one or more configuration parameters in the RRC connection reconfiguration message include at least one of a periodic D2D BSR timer expiry or a D2D BSR retransmission timer;
    send a buffer status report (BSR) to the eNB in accordance with the one or more configuration parameters;
    receive an uplink (UL) grant from the eNB for transmission of the D2D data from the UE; and
    send the D2D data using the UL grant provided by the eNB, the D2D data being transmitted from the UE using D2D radio bearers of the UE.

14. The UE of claim 13, wherein the RRC configuration request message includes a D2D resource request indicator information element (IE) or a D2D configuration request indicator IE.

15. The UE of claim 13, wherein the one or more processors are further configured to send the RRC configuration request message to the eNB using a signaling radio bearer of the UE.

16. The UE of claim 13, wherein the one or more processors are further configured to send a service request message to the eNB using a signaling radio bearer of the UE, the service request message for requesting establishment of cellular radio bearers for the UE.

17. A method for performing device-to-device (D2D) communications, the method comprising:

identifying, at a user equipment (UE), D2D data to be communicated to a destination UE, the D2D data being identified when the UE is in a radio resource control (RRC) idle mode with an evolved node B (eNB);

determining that the UE is limited to using a defined resource allocation mode to communicate the D2D data to the destination UE;

initiating a service request procedure at the UE, the service request procedure triggering the UE to perform an RRC connection establishment procedure with the eNB to switch the UE from the RRC idle mode to an RRC connected mode;

receiving an uplink (UL) grant from the eNB for communicating the D2D data to the destination UE;

receiving, at the UE, the UL grant from the eNB in response to sending a buffer status report (BSR) from the UE to the eNB, the BSR being sent to the eNB after the UE has switched to the RRC connected mode; and sending the D2D data to the destination UE using the UL grant provided by the eNB, the D2D data being communicated to the destination UE using D2D radio bearers of the UE.

18. The method of claim 17, further comprising sending the BSR from the UE to the eNB using one or more configuration parameters associated with the defined resource allocation mode, the one or more configuration parameters including at least one of a periodic D2D BSR timer or a D2D BSR retransmission timer.

19. The UE of claim 13, wherein the one or more processors are further configured to determine that the UE is limited to using the defined resource allocation mode based on a system information block (SIB) broadcast from the eNB.

* * * * *